Patented Nov. 29, 1938

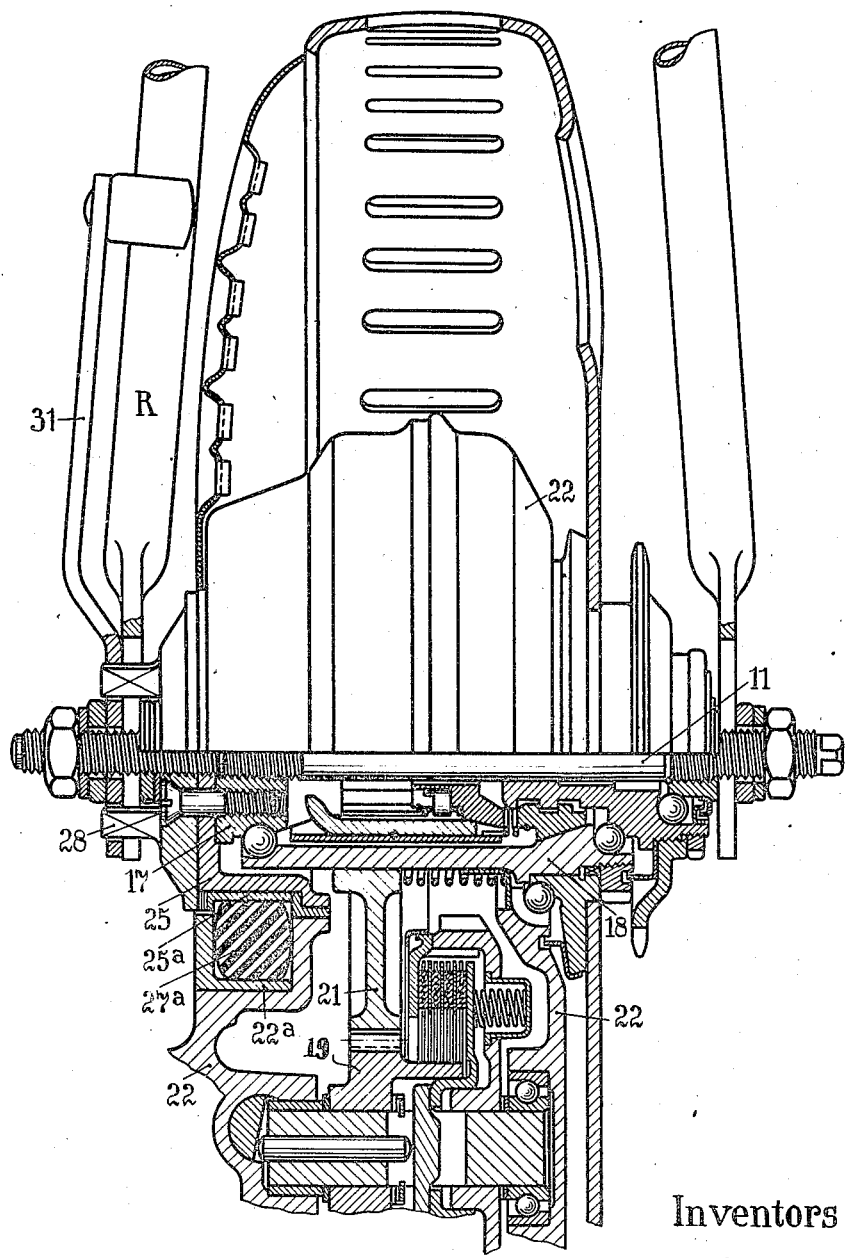

2,138,619

UNITED STATES PATENT OFFICE 2,138,619

FREEWHEEL BRAKE HUB DRIVEN BY A MOTOR MOUNTED IN THE DRIVING WHEEL

Gustav Steinlein, Forsthaus, Mainberg, near Schweinfurt, and Ludwig Bruckmoser, Schweinfurt, Germany Application March 29, 1938, Serial No. 198,772
In Germany April 8, 1937

2 Claims. (Cl. 180—33)

The present invention relates to a free-wheel brake hub, and especially a free-wheel hub with a back-pedalling brake driven by a motor mounted in the driving wheel of a conventional bicycle, the re-acting torque of which motor is transmitted to the frame of the vehicle by way of a resilient member and a stationary part of the free-wheel brake hub.

According to the arrangement forming the subject matter of the invention, the resilient member consists of an annular body of rubber or similar elastic material. This body is fixed by vulcanization to the resilient casing member and to a transmitting portion connected to the bearing cone of the free-wheel hub.

In this manner the braking torque and the re-acting torque of the drive may be transmitted by a common lever acting upon the brake cone.

Advantageously, the elastic transmitting member may, for the purpose of obtaining a safe bearing arrangement, be mounted in an annular space formed between the casing and the stationary transmitting part and may be connected to these two portions by vulcanization. The annular body of rubber preferably may be arranged between flanged rings which later are connected to the two parts of the gear.

Besides the favourable solution as regards space, the use of such an elastic intermediate member and the particular mounting of same has the further advantage also, that if the wheel has to be removed from the frame relatively few connections have to be released. By this means also a tightening against the interior of the casing is obtained. The strength of the stressed part of the frame or of the transmitting lever cannot be endangered by the two-fold stress acting in opposite directions, because the intermediate body of rubber effects damping of shocks and may be deformed in accordance with the magnitude of the stress.

The annular body of rubber also allows a certain resiliency in an axial direction by which shocks are received which superpose the forces acting in the circumferential direction.

The use of the arrangement according to the invention in many cases also leads to a reduction of weight.

In the accompanying drawing the new arrangement of the transmitting device according to the invention is shown by way of example.

The single figure shows a plan view with a section through the hub, the gear and the casing.

The hub bush 18 containing a free-wheel and brake device of any desired construction includes a sleeve encircling the axle 11 of the driving wheel and is driven by a motor, not shown in the drawing, by way of the toothed wheel 21 fixed upon the hub sleeve 18, and meshing with a gear 19. The bearing cone 17 fixed upon the axle 11 and which receives the braking torque and transmits same by a lever 31 upon the vehicle frame R is connected by screws or other means to a preferably bell-shaped fixed body 25. Projections 28 of the body 25 extend through the slot in the fork to engage the lever 31.

The outer circumference of the resilient annular body of rubber 27a which receives the re-acting torque of the motor drive is rigidly connected to the gear casing 22 of the motor, whereas its inner circumference is rigidly connected to the fixed body 25. This connection preferably is effected by vulcanizing the annular body upon the oppositely arranged cylindrical surface of the two parts mentioned above to which then firmly sticks the annular body 27a.

Special intermediate rings 25a and 22a may be provided to which the annular body is connected and which then are secured to the bell-shaped body 25 in the casing by pressing seat or in another suitable manner, whereby the mounting of the resilient annular body is rendered more easy.

The casing disclosed in part in this application is claimed in co-pending application of Ludwig Bruckmoser, Serial No. 191,005, filed February 17, 1938.

Having now particularly described and ascertained the nature of our said invention and in what manner the same is to be performed, we declare that what we claim is:—

1. A free-wheel brake hub which is driven by a motor mounted in a driving wheel rotatably arranged in a vehicle frame, comprising a stationary member forming part of said free-wheel brake hub, a transmitting portion connected to said stationary member of said free-wheel brake hub, a casing for the gear of said motor and a resilient member consisting of an annular body of rubber, said annular body of rubber being vulcanized to said casing and to said stationary member of said free-wheel brake hub, the whole arrangement serving the purpose of transmitting the re-acting torque of said motor to said vehicle frame.

2. A free-wheel brake hub which is driven by a motor mounted in a driving wheel rotatably arranged in a vehicle frame, comprising a stationary member forming part of said free-wheel brake hub, a transmitting portion connected to said stationary member of said free-wheel brake hub, a casing for the gear of said motor, a resilient member consisting of an annular body of rubber, flanged rings connected to said annular body of rubber, said flanged rings being adapted to be connected to said casing and to said stationary member of said free-wheel brake hub, the whole arrangement serving the purpose of transmitting the re-acting torque of said motor to said vehicle frame.

STEINLEIN, GUSTAV.
BRUCKMOSER, LUDWIG.